(12) United States Patent
Thomas

(10) Patent No.: US 6,843,910 B1
(45) Date of Patent: Jan. 18, 2005

(54) ORNAMENTAL POND

(76) Inventor: Charles W. Thomas, 2100 Caldwellmill Trace, Birmingham, AL (US) 35243

( * ) Notice: Subject to any disclaimer, the term of this patent is extended or adjusted under 35 U.S.C. 154(b) by 0 days.

(21) Appl. No.: 10/628,851

(22) Filed: Jul. 28, 2003

Related U.S. Application Data

(60) Provisional application No. 60/400,596, filed on Aug. 2, 2002.

(51) Int. Cl.[7] .................................................. C02F 3/32
(52) U.S. Cl. ........................ 210/167; 210/170; 210/259; 210/263; 210/747; 210/602
(58) Field of Search ................................. 210/167, 170, 210/252, 259, 263, 416.1, 602, 747

(56) References Cited

U.S. PATENT DOCUMENTS

| | | | | |
|---|---|---|---|---|
| 4,276,164 A | * | 6/1981 | Martone et al. | 210/170 |
| 4,368,120 A | * | 1/1983 | Martone et al. | 210/170 |
| 5,584,991 A | * | 12/1996 | Wittstock et al. | 210/151 |
| 5,993,649 A | * | 11/1999 | DeBusk et al. | 210/97 |
| 6,290,844 B1 | * | 9/2001 | Tennyson, Jr. | 210/169 |
| 6,740,232 B1 | * | 5/2004 | Beaulieu | 210/151 |

FOREIGN PATENT DOCUMENTS

| | | | |
|---|---|---|---|
| DE | 3918803 A1 | * | 12/1990 |
| JP | 11-197653 A | * | 7/1999 |

* cited by examiner

Primary Examiner—Fred G. Prince
(74) Attorney, Agent, or Firm—Smith, Gambrell & Russell, LLP

(57) ABSTRACT

A decorative aquatic pond as found in residential gardens or the like having: an impervious liner defining a pond and confining a quantity of water within the pond, a filtration system comprising: a secondary pool separated from the pond by a pervious wall, a skimmer basin located within the secondary pool adjacent the pervious wall and adapted to receive surface water into the basin from the pond, a catch net disposed within the skimmer basin, a cover affixed over a major portion of the catch basin, a bottom drain disposed along the bottom of the pool distal the pond, a quantity of filter rock filling the pond externally of the basin and overlying the cover and the perforated conduit, and a submersible pump housed within the basin and pumping water from the basin and the perforated conduit to a return path to the pond. Aquatic plants are rooted in the filter rock to aid in processing the water drawn through the rocks into the pump.

17 Claims, 3 Drawing Sheets

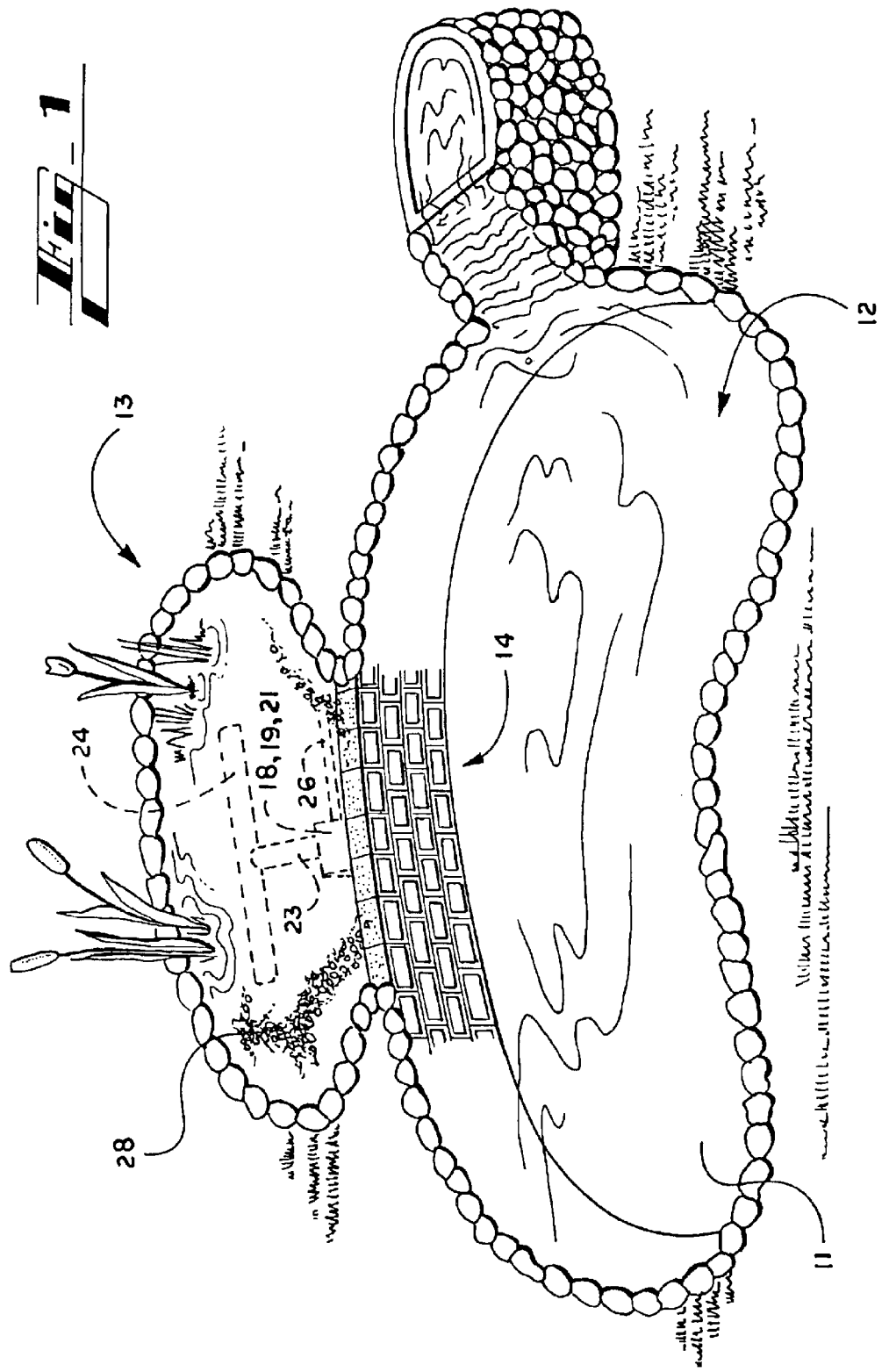
Fig_1

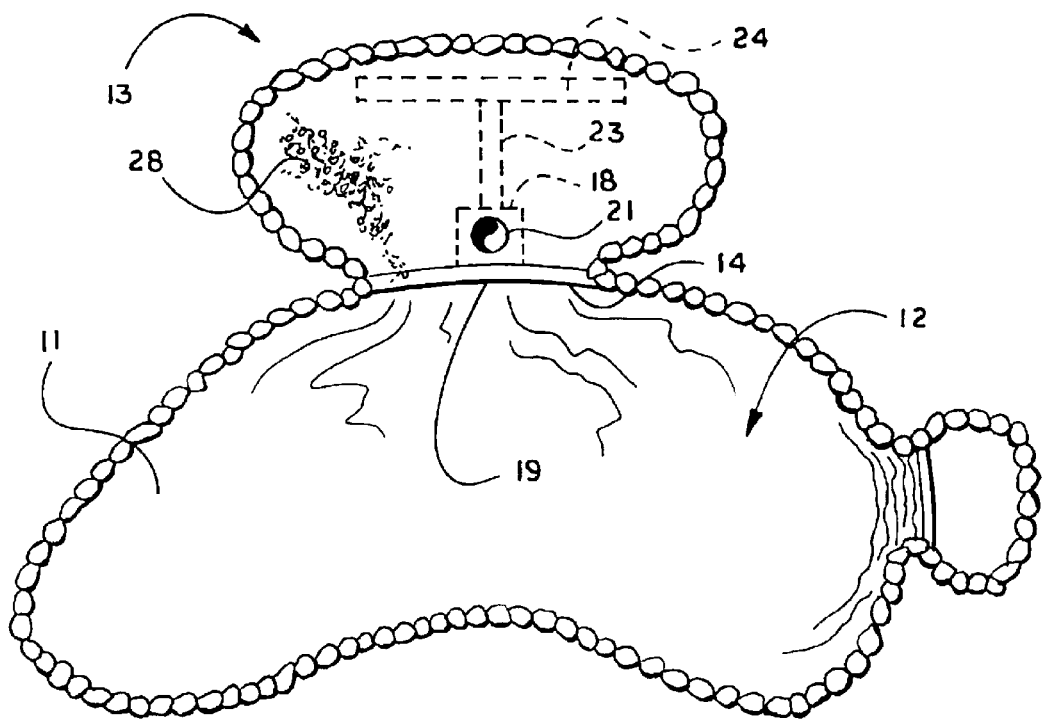
*Fig_2*
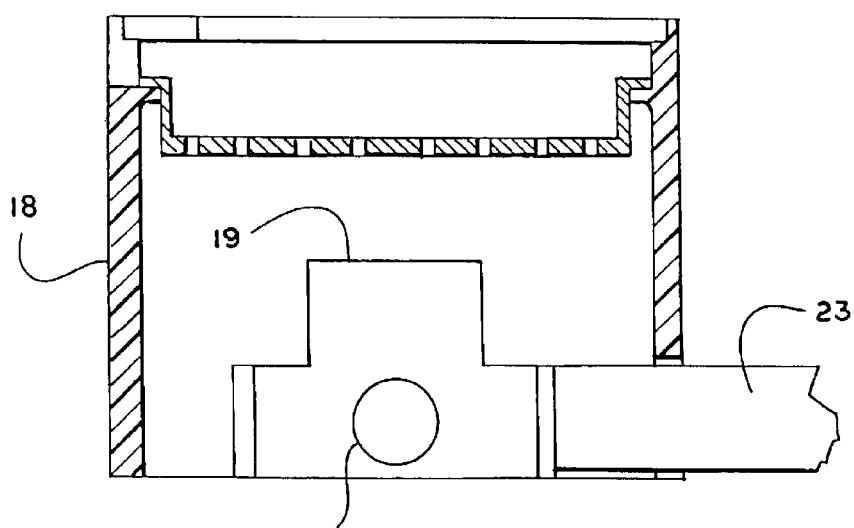
*Fig_3*

ORNAMENTAL POND

CROSS REFERENCE TO RELATED APPLICATIONS

This application claims priority from Provisional Patent Application No. 60/400,596, filed on Aug. 2, 2002.

FIELD OF THE INVENTION

The present invention relates to the field of aquatic gardens or artificial ponds. More particularly the present invention relates to filtration systems for such ponds. In even greater particularity the present invention relates to a structure and method for purifying water in an aquatic garden which requires little maintenance or labor to remove filtrate material

BACKGROUND OF THE INVENTION

The provision of ornamental ponds and aquatic gardens is a multi-million dollar industry. Likewise, the maintenance of such ponds is also a multimillion dollar industry. Numerous variations on pond set up exist, however, it is common to utilize pumps and artificial filter material to establish a water flow in the pond and filter the water to maintain a life sustaining level of clarity and an aesthetically pleasing appearance to the pond. Some pond developers have suggested using natural filter material such as gravel or rock in the bottom of such ornamental ponds, however, such usage requires significant labor when the gravel bed becomes loaded and needs to be cleaned. What is needed is a perpetual system requiring minimal cleaning and replacement of filtration materials.

SUMMARY OF THE INVENTION

The present invention is used in a decorative aquatic pond as found in residential gardens or the like having an impervious liner defining a pond and confining a quantity of water within the pond, a filtration system comprising: a secondary pool separated from the pond by a pervious wall, a skimmer basin located within the secondary pool adjacent the pervious wall and adapted to receive surface water into the basin from the pond, a catch net disposed within the skimmer basin, a cover affixed over a major portion of the catch basin, a bottom drain disposed along the bottom of the pool distal the pond, a quantity of filter rock filling the pond externally of the basin and overlying the cover and the perforated conduit, and a pump in communication with the basin and pumping water from the basin and the perforated conduit to a return path to the pond. Aquatic plants are rooted in the filter rock to aid in processing the water drawn through the rocks into the pump.

BRIEF DESCRIPTION OF THE DRAWINGS

An aquatic ornamental pond system is depicted in the Figures which form a portion of this disclosure and wherein:

FIG. 1 is a perspective view of the system, showing submerged or buried components in dotted line;

FIG. 2 is a plan view of the system; and,

FIG. 3 is a sectional view of the catch basin from one side 2.

DESCRIPTION OF THE PREFERRED EMBODIMENT

Figure 4:
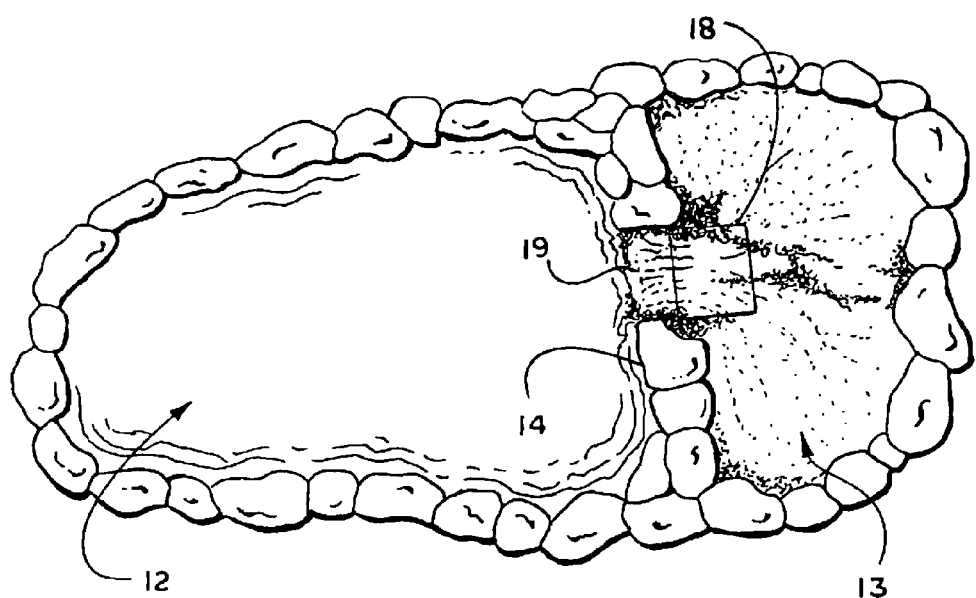
FIG. 4 is a second plan view.
Figure 5:
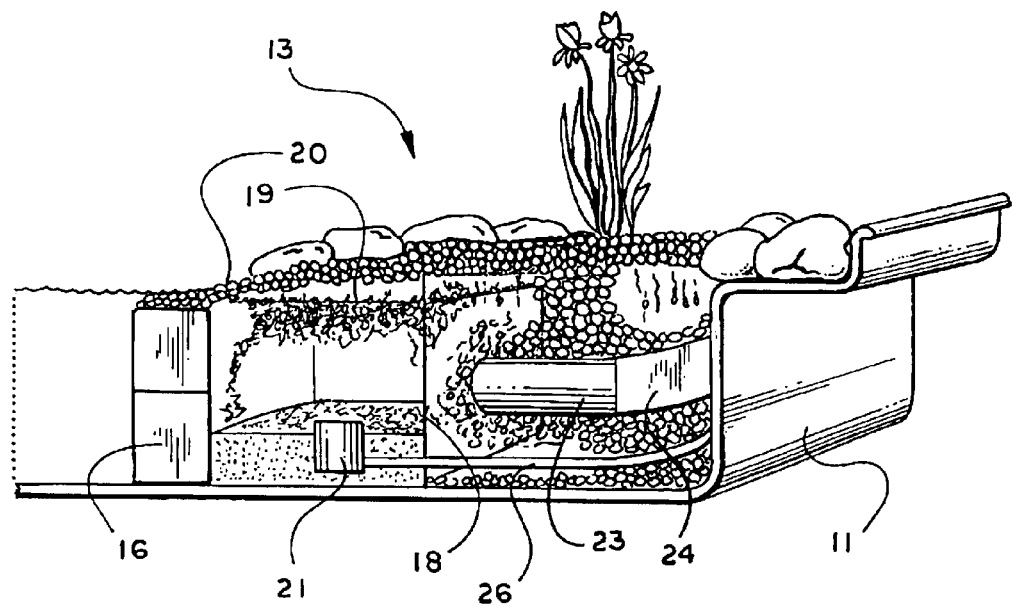
FIG. 5 is a sectional to the secondary pool.

Ornamental ponds are generally located by choice rather than by natural occurrence, thus it should be understood that construction of the pond usually requires excavation of a depression in which the pond water will be contained. Of course a natural depression could be used if conveniently available. Containment is generally accomplished by use of a pervious liner 11 which conforms to the depression or, which is molded to give a desired shape to the pond 12. The pervious liner 11 is well known in the art as is the manner of placing the liner in the pond 12. The present invention utilizes a secondary pool 13, also formed at the same time by excavation of a depression adjacent the pond 12. Secondary pool 13 is likewise made waterproof using a liner 11, such that both pond 12 and secondary pool 13 are part of the same body of water and in fluid communication and jointly contain the water used in the system. A decorative rock wall generally overlies the liner about the edges of the system to hold the liner 11 in place although such is not necessary. A pervious wall 14 is established between pond 12 and pool 13. Wall 14 must be sufficiently open to allow the free flow of water from the pond into the pool without clogging due to sedimentation deposits. In a preferred embodiment the pervious wall may be made of hollow building blocks 16 having internal passages stacked to an appropriate height, usually less than three feet with the internal passages providing for communication between pond and pool.

As seen more clearly in FIG. 2, adjacent wall 14 and situated within pool 13 is a preformed catch basin 18 made of a suitable molded plastic. Referring to FIG. 3 it may be seen that catch basin 18 has a skimmer channel 19 along an upper margin thereof facing the pond such that water can pass directly from the surface of the pond 12 into the catch basin. Suspended from the upper margin of the basin is a net 17 or skimmer basket through which water from the pond may pass and which serves as a guard to catch larger debris. Within the basin 18 is a submersible pump 21 which includes a first inlet 22 for receiving water entering the basin 18 via skimmer channel 19. It will be appreciated that the pump may also be external to the basin 18 and simply have an intake to draw water from the basin. In either case, the pump also has a second inlet, which may be combined with the first inlet in practice for receiving water from externally of the basin 18 via a conduit 23 which communicates through the wall of basin 18 with the secondary pool 13. Conduit 23 is attached to an extended receiver 24 positioned along the bottom of pool 13 distal wall 14. Conduit 23 may extend from the back or side of basin 18.

A discharge outlet 26 on pump 21 passes from basin 18 and out of secondary pool 13 to a point for recirculation of water to pond 12. The basin 18 is partially covered by a top 20 which does not interfere with skimmer channel 19 and which helps to secure the catch net 17 or skimmer basket. The catch net 17 may have a rigid stiffener about its margin to interact with the basin walls and top 20 for proper securement.

Secondary pool 13 is filled to a level one inch or so above the water level in the system with filter 28 material which is preferably No. 57 pea gravel, or any other non reactive rock suitable for use in an aqueous environment having irregular shapes and measuring between about one-half to two inches in any dimension. Other examples of suitable rock, including lava rock will come to mind, however it is to be understood that any non reactive rock which will provide sufficient interstitial space for water passage and particulate filtration would be suitable. The spacing and density of the rock should also accommodate the growth of root systems for plants to be planted in the filter material such that natural removal of the nutrient material in the water being filtered can occur. It will be appreciated that receiver 24 is covered over by the filter material which also overlies the basin top 20 so that the secondary pool has the appearance of a rock bed or bog area with vegetation growing out of the filter material in the same manner as vegetation grows out of the areas adjacent a naturally occurring pond.

In operation, the pond is filled with water, which passes through the permeable wall and fills the interstices of the filter material in the secondary pool and flows over the skimmer channel into the basin. Activation of the pump draws water out of the basin and into the receiver through the filtration material such that particulate filtration occurs in the bog. The water from these sources is discharged by the pump into a recirculation path such as an artificial waterfall or geyser which aerates the water before it returns to the pond. Plants in the bog an anaerobic bacteria provide further natural recycling of the particulate and organic material brought into the bog by the flow of the water to the pump. Accordingly, the pond area may be utilized for decorative plants, lights, fish, and structures in a clear water environment, without any significant accumulation of debris or particulate matter in the pond.

Thus, although there have been described particular embodiments of the present invention of a new and useful ORNAMENTAL POND, it is not intended that such references be construed as limitations upon the scope of this invention except as set forth in the following claims.

What is claimed is:

1. In a decorative aquatic pond having an impervious liner defining the pond and confining a quantity of water within the pond, a filtration system comprising:
   a secondary pool separated from the pond by a pervious wall;
   a skimmer basin located within said secondary pool adjacent said pervious wall and adapted to receive surface water into said basin from the pond;
   a debris guard within said skimmer basin;
   a cover affixed over a major portion of said skimmer basin;
   a perforated conduit disposed along the bottom of said pool distal the pond;
   a quantity of filter rock filling said secondary pool externally of said basin and overlying said cover and said perforated conduit; and
   a pump in communication with said basin and pumping water from said basin and said perforated conduit to a return path to the pond.

2. The filtration system as defined in claim 1 wherein said return path is exposed to open air.

3. The filtration system as defined in claim 2 wherein said return path comprises an artificial waterfall into the pond.

4. The filtration system as defined in claim 2 wherein said return path comprises a fountain.

5. The filtration system as defined in claim 1 wherein said filter rock is sized such that living aquatic plants may be rooted therein.

6. The filtration system as defined in claim 1 further comprising hydroponic plants rooted in said filter rock.

7. The filtration system as defined in claim 1 wherein said filter rock is dimensionally larger than any apertures in said perforated conduit.

8. The filtration system as defined in claim 1 wherein said pervious wall retains said filter rock in said pool and allows free passage of water between the pond and said pool.

9. The filtration system as defined in claim 1 wherein said skimmer basin includes a rigid support for a catch net.

10. A filtration system for an ornamental pond containing water comprising:
    a secondary pool adjacent the ornamental pond and in aqueous communication with the ornamental pond such that the water level is the same in the pond and said secondary pool;
    a skimmer basin in said secondary pool having an inlet at the surface of the water therein;
    a pump in communication with said skimmer basin having an intake from the bottom of said secondary pool and an outlet discharging to the ornamental pond; and
    natural filtration media filling said secondary pool above water level and surrounding said skimmer basin.

11. A filtration system as defined in claim 10 wherein said natural filtration media comprises a plurality of non-reactive rocks having at least one aquatic plant rooted therein.

12. A filtration system as defined in claim 11 wherein said filtration media is retained in said secondary pool by a pervious wall separating said secondary pool from the ornamental pond.

13. A filtration system as defined in claim 12 wherein said skimmer basin is adjacent said pervious wall and receives water from the top of the ornamental pond.

14. A filtration system as defined in claim 13 wherein said return path includes an aerator.

15. A filtration system as defined in claim 14 wherein said aerator is an artificial waterfall.

16. A filtration system as defined in claim 14 wherein said aerator is a fountain.

17. A filtration system as defined in claim 10 including a debris guard disposed within said skimmer basin above said pump intake.

* * * * *